United States Patent
Delannoy et al.

(10) Patent No.: US 8,462,058 B2
(45) Date of Patent: Jun. 11, 2013

(54) AIRCRAFT ANTENNA

(75) Inventors: Frederique Delannoy, Pujaudran (FR); Sebastien Saletzki, Cornebarrieu (FR)

(73) Assignee: Airbus Operations S.A.S., Toulouse (FR)

( * ) Notice: Subject to any disclaimer, the term of this patent is extended or adjusted under 35 U.S.C. 154(b) by 308 days.

(21) Appl. No.: 12/990,667

(22) PCT Filed: May 20, 2009

(86) PCT No.: PCT/FR2009/000594
§ 371 (c)(1),
(2), (4) Date: Nov. 2, 2010

(87) PCT Pub. No.: WO2009/153433
PCT Pub. Date: Dec. 23, 2009

(65) Prior Publication Data
US 2011/0050517 A1    Mar. 3, 2011

(30) Foreign Application Priority Data
May 26, 2008    (FR) ..................... 08 53402

(51) Int. Cl.
*H01Q 1/28* (2006.01)
(52) U.S. Cl.
USPC .......................................... 343/705; 343/708
(58) Field of Classification Search
USPC .................. 343/705, 708, 711–713, 700 MS, 343/704
See application file for complete search history.

(56) References Cited

U.S. PATENT DOCUMENTS

| | | | |
|---|---|---|---|
| 5,589,839 | A | 12/1996 | Lindenmeier et al. |
| 5,760,744 | A | 6/1998 | Sauer |
| 6,926,786 | B2 * | 8/2005 | Frost et al. ............... 156/101 |
| 2003/0142018 | A1 | 7/2003 | Lange |
| 2005/0200526 | A1 | 9/2005 | Crain et al. |
| 2007/0216589 | A1 | 9/2007 | Li et al. |

FOREIGN PATENT DOCUMENTS
EP    1 575 128    9/2005

OTHER PUBLICATIONS
International Search Report issued Dec. 8, 2009 in PCT/FR09/000594 filed May 20, 2009.

* cited by examiner

*Primary Examiner* — Hoang V Nguyen
(74) *Attorney, Agent, or Firm* — Oblon, Spivak, McClelland, Maier & Neustadt, L.L.P.

(57) ABSTRACT

A wireless communication device for an aircraft that includes at least one antenna, for example a wide-band antenna, and a transparent multilayered substrate, for example a side glazing, a front glazing or a porthole of the aircraft, adapted for receiving the at least one antenna. At least a portion of one layer of the substrate is at least partially reflective to electromagnetic waves transmitted or received by the at least one antenna, wherein the at least one portion of the layer of the substrate is located at least partially opposite the at least one antenna. The at least one portion of the layer of the substrate can be a de-icing or defogging heating film.

11 Claims, 4 Drawing Sheets

AIRCRAFT ANTENNA

This invention relates to antennas for data communication and more particularly an aircraft antenna.

Many vehicles, when parked, need to exchange data with a fixed infrastructure, especially for maintenance operations or to provide the passengers with a high-output connection to an open network.

By way of illustration, for the operation of aircraft, more and more information items have to be exchanged between the systems of an airline company on the ground and the aircraft, in particular when the latter are on stopover at the jetway of a terminal or in maintenance phase in the hangar.

First of all there are systems referred to as wired, according to which it is necessary to implement a physical connection between the vehicle and the fixed infrastructure. For example, an Ethernet-type link using copper wires allows an output on the order of a hundred megabits per second. Nonetheless, while such solutions provide a very high data transmission output, they require the presence of an operator to implement such a connection.

Furthermore, there are systems using wireless technologies, especially laser transmission technologies allowing very high transmission outputs but which pose alignment problems, the transmitter and the receiver having to be positioned according to a very precise configuration. These solutions also are sensitive to dust or other dirt that may at least partially obstruct the laser transmitter and/or receiver.

Other wireless data transmission solutions also have been developed from wireless network technologies, for example WiFi (acronym for Wireless Fidelity in English terminology, WiFi is a trademark) solutions, or cellular telephony technologies, in particular allowing devices in an aircraft to exchange data with base stations established in an airport. Such low-power communication methods use one or more low-power antennas installed outside the aircraft.

Thus, in the development cycle of an aircraft, more and more antennas have to be set up.

Nonetheless, depending on the set-up of the antenna on the ground, variable from one infrastructure to another, there may be elements of the infrastructures on the ground or of the aircraft, for example wings, that block out the direct radio path between these antennas and bring about a degradation in communication performances.

Furthermore, it is desirable that the communications between an aircraft and the ground do not disrupt the functioning of the internal aircraft communications, in particular the WiFi and WiMax communications of the maintenance personnel and/or the passengers' portable equipment items, and vice versa.

A need therefore exists to improve the quality of the connections between a parked vehicle and a fixed infrastructure, in particular the data transmission output.

The invention thus has as an object a wireless communication device for an aircraft comprising at least one antenna and a transparent multilayer substrate adapted for receiving the said at least one antenna, at least one part of one layer of the said substrate being at least partially reflective to electromagnetic waves transmitted or received by the said at least one antenna, the said at least one part of the layer of the said substrate being located at least partially opposite the said at least one antenna.

In this way, the device according to the invention makes it possible to improve the intrinsic performances of the antenna and to implement a quasi-directional antenna. Such a device also makes it possible to reduce the disruptions on other equipment items that may result from the device and to optimize the wave angle of the antenna in relation to the antennas installed on the ground. In addition, the device according to the invention has no effect on the aerodynamic drag of the aircraft.

According to a specific embodiment, the said transparent substrate is a side glazing, a front glazing or a window of the said aircraft. The device according to the invention thus may be easily incorporated into an aircraft.

The said at least one part of the layer of the said substrate advantageously is a de-icing or defogging heating film. In this way the device according to the invention may use an existing reflective layer.

According to a specific embodiment, the said at least one antenna is inserted between two layers of the said substrate. The device according to the invention thus is discrete and resistant to external stresses.

Alternatively, the said at least one antenna is fastened onto one of the outer surfaces of the said substrate. In this way it is possible to implement the invention with existing glazings.

Still according to a specific embodiment, the said at least one antenna is placed between the said part of the layer of the said substrate and the outside surface of the said device. In this way the device according to the invention allows the exchange of data between the aircraft and a system outside same.

Alternatively, the said at least one antenna is placed between the said part of the layer of the said substrate and the inside surface of the said device. The device according to the invention thus allows the exchange of data among several equipment items located inside the aircraft.

Still according to a specific embodiment, the said at least one antenna, called first antenna, is positioned between the said at least one part of the layer of the said substrate and an outer surface of the said device, the said device further comprising at least one second antenna, the said at least one second antenna being positioned between the said at least one part of the layer of the said substrate and another outer surface of the said device, opposite the said outer surface. In this way, the device according to the invention allows data exchange between the aircraft and a system outside the latter and among several equipment items located inside the aircraft.

The invention also has as an object an aircraft comprising at least one device such as described above.

According to a specific embodiment, the aircraft comprises at least one second device such as described above, the said at least two devices forming at least one part of two opposite side glazings of the said aircraft, in order to increase the overall wave angle of the antennas and to take advantage of a diversity effect which, according to the location of the access points, makes it possible to take advantage of the best signal received by one or the other of the said at least two devices.

Other advantages, purposes and characteristics of this invention become apparent from the detailed description that follows, presented by way of non-limitative example, with reference to the attached drawings in which:

FIG. 1 schematically illustrates an aerial view of an aircraft parked near a jetway;

Figure 5:
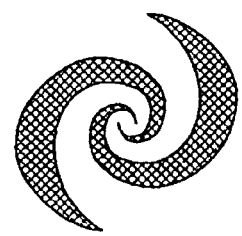
Figure 6:
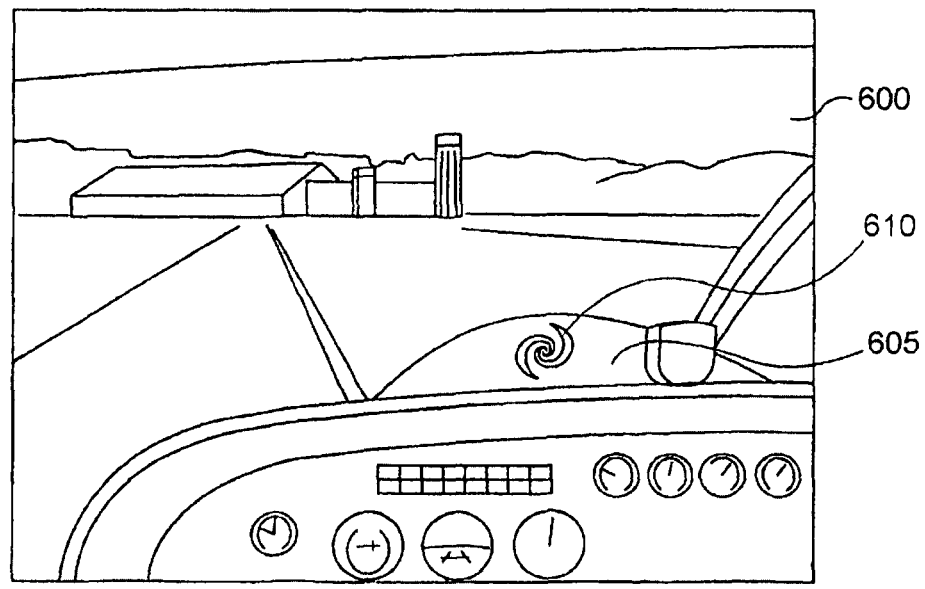
Figure 7:
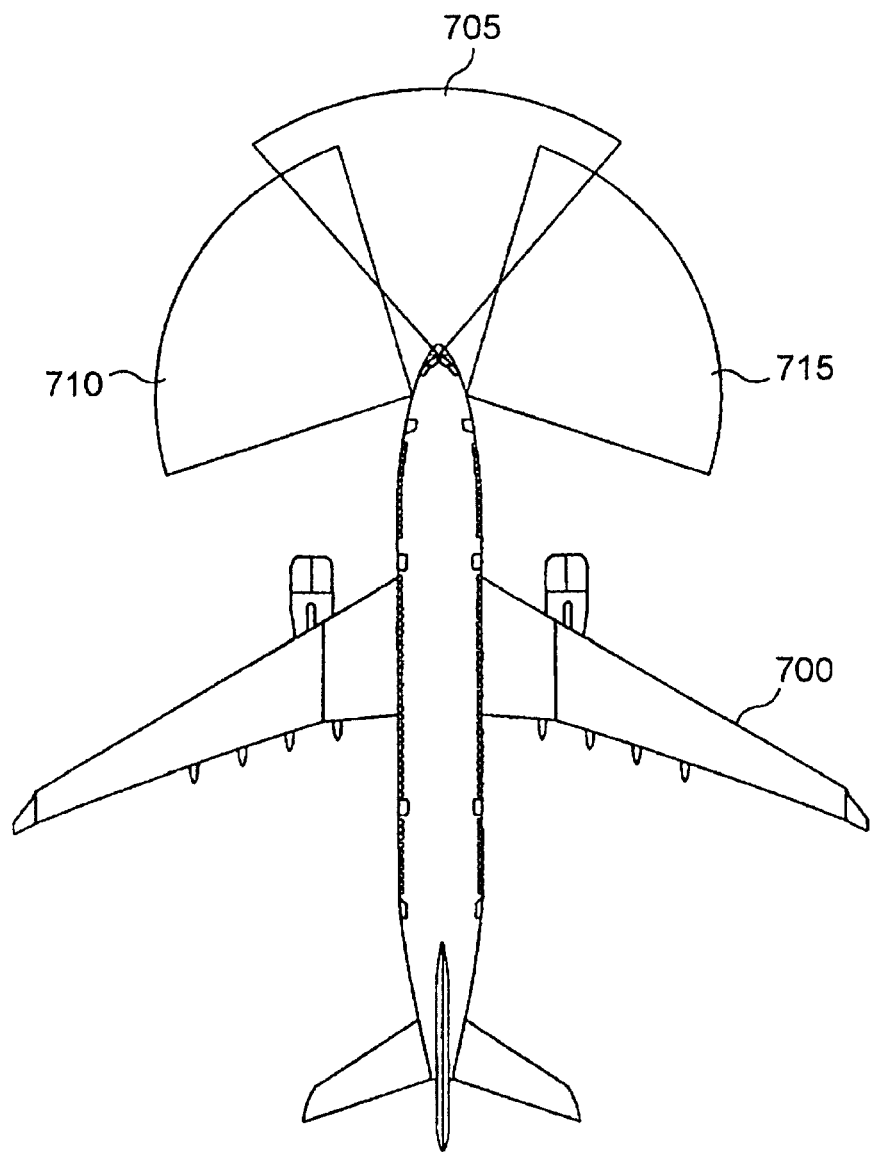

FIG. 5 presents an exemplary equiangular spiral antenna that may be used to implement the invention;

FIG. 6 illustrates a third embodiment of a communication device in accordance with the invention according to which an antenna is bonded or fixed onto a glazing, to an inside or outside part of the glazing; and, FIG. 7 illustrates the wave angle of antennas disposed in or on the glazings of an aircraft cockpit comprising a reflective layer.

The invention consists, especially in an aircraft, of combining a standard antenna, for example a WiFi-type wideband antenna, with a reflective layer incorporated into the substrate of the antenna to form a wireless communication device making it possible to improve the characteristics of the antenna. According to a specific embodiment, a standard antenna is set up in or on a glazing comprising a reflective layer, for example a heating layer, which interacts with the antenna by behaving as a reflector. The standard antenna may be bonded onto the glazing of an aircraft or incorporated into the glazing during the manufacture thereof.

The radiating element of the antenna is placed in front of the reflective layer of the glazing in order to optimize the radiation. The position of the radiating element of the reflective layer thus makes it possible to implement a quasi-directional antenna and to improve the intrinsic performances of the antenna.

It also is possible to conceal this antenna in a screen-printed part of the glazing.

The glazing preferably comprises a connector connected to ground and to the antenna, thus making it possible to come to connect a defined impedance cable to the communication system of the aircraft. It also is possible to use a connection cable the ground reference of which is not defined, for example a high-impedance cable.

In this way, the aircraft antenna according to the invention allows a wireless communication between the aircraft and an infrastructure on the ground or inside the aircraft.

The use of the heating layer as a reflector makes it possible to send communications to the outside when the antenna is disposed on the exterior side of the glazing in relation to the heating layer. The antenna then allows communications with the ground, for example with an access point on the ground or a wireless network client.

The use of the heating layer as a reflector makes it possible to send communications to the inside when the antenna is disposed on the interior side of the glazing in relation to the heating layer. The antenna then allows communications with the inside of the aircraft, for example with a wireless network inside the aircraft.

In these two cases, the reflector makes it possible to attenuate the signals in one direction or in the other and, simultaneously, to fulfill the role of reflector to improve the gain of the antenna in the opposite direction.

It also is possible to install two antennas, placed on both sides of the heating layer, to allow two simultaneous communications, one to the outside and the other to the inside of the aircraft.

The antenna preferably is used in transmission and reception, covering the frequency bands assigned to the wireless technologies.

It is recalled that the WiFi-type communication technologies provide an extensive coverage on the ground. It therefore is possible, with the aid of quasi-directional antennas, to connect easily to a corresponding type of network.

Small-size antennas incorporated into the glazings of the cockpit or the cabin windows therefore may be used to implement a connection with access points on the ground. The presence of conductive materials inside the glazings allows these antennas to be quasi-directional to the outside of the airplane with a small likelihood of interfering with the onboard equipment items.

It also is possible to use these antennas, according to the composition of the glazing, for covering the inside of the airplane with wireless technologies. These antennas also may be set up in windows or cockpit glazings.

In this way, the communication devices according to the invention make it possible to replace or supplement an existing WiFi-type antenna.

When the aircraft is on the ground, near a communication antenna, the location of the access point is not known in advance. It therefore is possible, in particular, to use the communication device according to the invention to supplement an existing antenna when the ground base station is in a zone in front of the aircraft, poorly covered by same.

Figure 1:
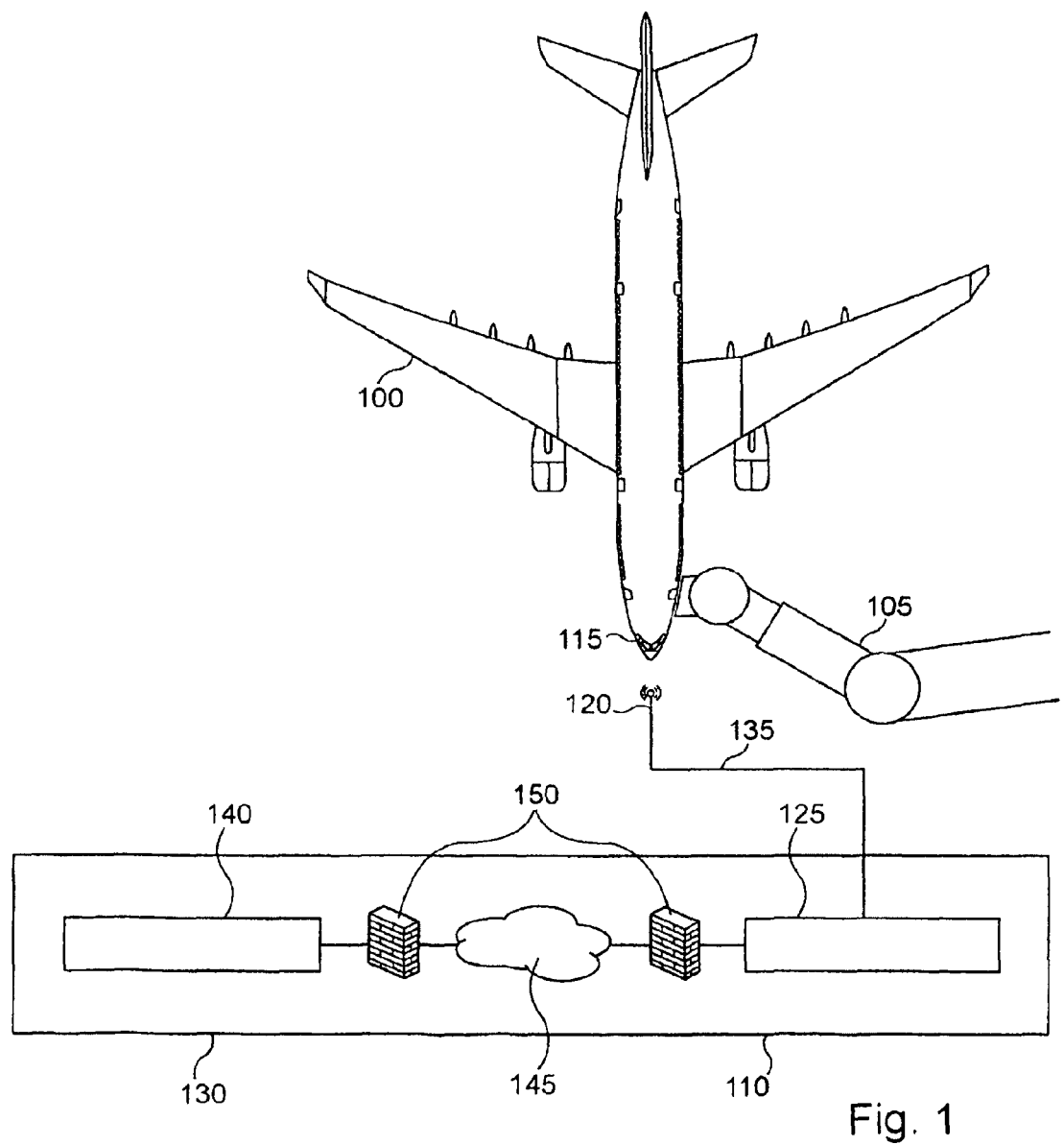

FIG. 1 schematically illustrates an aerial view of an aircraft parked near a jetway. As shown, aircraft 100 is parked near an infrastructure on the ground, here a jetway 105, so that a door of aircraft 100 is opposite the end of jetway 105.

Aircraft 100 comprises a data-processing system taken on board (not shown), for example with the maintenance system, able to exchange data with a data-processing system on the ground 110.

Aircraft 100 comprises a WiFi- or WiMax-type antenna 115, here incorporated into the glazing of the cockpit. Antenna 115 is connected to the data-processing system of aircraft 100 through an appropriate communication interface.

An access terminal comprising an antenna 120 is positioned on the ground, for example in front of aircraft 100.

The radio module (not shown) associated with antenna 120 is connected to network 125 of airport terminal 130 by a link 135, here a wired link. Network 125 is connected, for example, to local network 140 of the airline company via an Internet-type network 145 through firewalls 150 (called firewall in English terminology).

Similarly, an antenna connected to the network of the local company may be placed on a structural element, movable or not, removable or not, of a maintenance hangar, in order to be positioned near aircraft 100 comprising antenna 115 when the aircraft is in the maintenance hangar.

Figure 2:
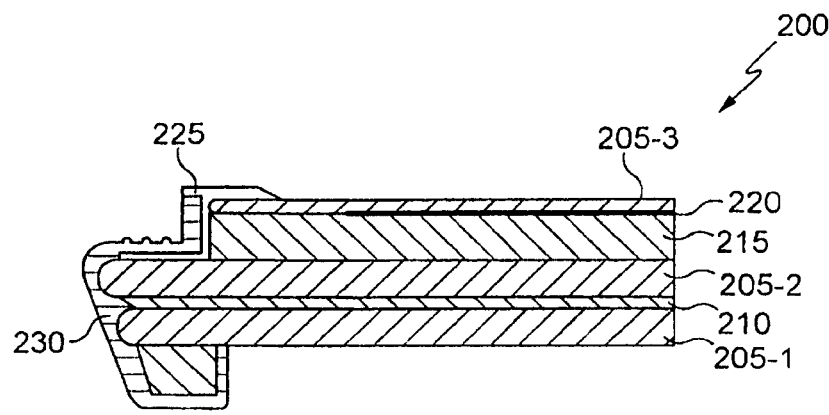
FIG. 2 shows a cross-sectional view of a glazing used as front glazing of an aircraft.

FIG. 2 shows a cross-sectional view of a glazing 200 used as front glazing for an aircraft.

As illustrated, the glazings comprise a plurality of glass layers, generally three, here referenced 205-1, 205-2 and 205-3. Glass layer 205-3, intended to be placed toward the outside of the aircraft, often has a thickness of three millimeters. Glass layer 205-1, intended to be placed toward the inside of the aircraft, as well as inner glass layer 205-2, generally have a thickness of eight millimeters.

The glass layers are separated by inset layers 210 and 215 made, for example, of Polyurethane (PU) or PolyVinyl Butyral (PVB). Inset layer 210, placed between glass layers 205-1 and 205-2, may have a thickness of one millimeter. Inset layer 215, placed between glass layers 205-2 and 205-3, generally has a thickness of about eight millimeters.

The reflective layer, here partial, is implemented with heating film 220 comprising, for example, tin-doped indium oxide, also called ITO. Heating film 220 is positioned between inset layer 215 and glass layer 205-3.

Furthermore, the edge of the glazing is formed by a section comprising elements 225 and 230 generally made of polysulfide rubber (PR) and silicone, used to fasten the glazing.

The heating film may be obtained, for example, according to the method described in the patent FR 2 695 117.

The glazings used to form the side glazings (cockpit side glazings or cabin windows) are similar to glazing 200. Nonetheless, the glass layers used, in particular glass layers 205-1 and 205-2, have different thicknesses, for example six and five millimeters, respectively. Furthermore, heating layer 220 generally is located between glass layer 205-2 and inset layer 215 and not between inset layer 215 and glass layer 205-3.

The heating film is used for de-icing of the front glazings and for defogging of the side glazings.

The antenna may be set up directly in the glazing during its manufacture by taking advantage of its multilayer construction.

Nonetheless it should be noted that, because of the superposition of the layers forming the front glazings and the position of the heating film, it is difficult to insert an antenna between the heating film and the outside surface of these glazings.

Nevertheless, the insertion of an antenna between the heating film and the inside surface of these glazings allows a wireless communication in the cockpit, for example according to a network architecture of WLAN (acronym for Wireless Local Area Network in English terminology) or WPAN (acronym for Wireless Personal Area Network in English terminology) type.

In the side glazings, the distance between the outside part of the glazing and the heating part is sufficient to allow the setting up of an antenna between a glass layer and a Polyurethane inset layer. This antenna takes advantage of the heating part as a reflector in order to improve the gain and the directivity of the antenna while minimizing disruptions of equipment items located in the cockpit.

The setting up of an antenna in each side glazing makes it possible to take advantage of a diversity effect which, according to the location of the access points, makes it possible to take advantage of the best signal received by one or the other antenna.

Furthermore, the presence of a reflective layer in the glazing makes it possible to attenuate the radiation in one or the other direction. In this way it is possible to cover the cockpit alone or to radiate toward the outside of the airplane without disrupting the enclosure of the cockpit. This attenuation is more or less effective according to the frequency band used.

Figure 3:
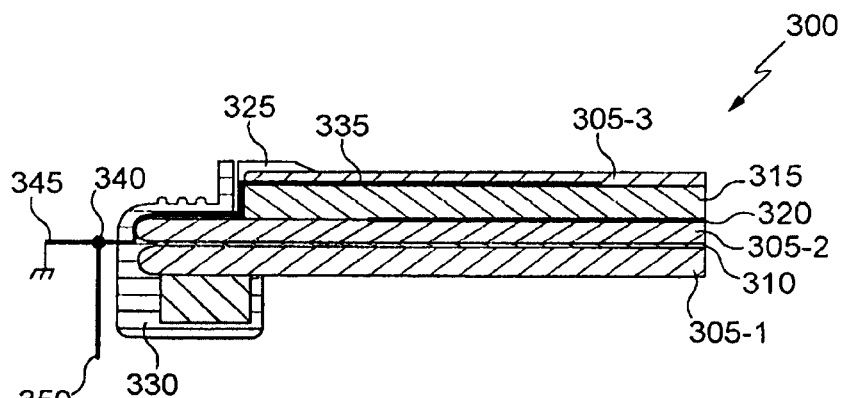
FIG. 3 illustrates a first embodiment of a wireless communication device in accordance with the invention according to which an antenna is inserted into the glazing, between the outside surface of the glazing and a heating film.

FIG. 3 illustrates a first embodiment of a device for wireless communication in accordance with the invention, according to which an antenna is inserted in the glazing, between the outside surface of the glazing and a heating film.

Like the glazing illustrated on FIG. 2, glazing 300 comprises three glass layers 305-1 to 305-3 separated by inset layers 310 and 315.

Heating film 320 here is inserted between glass layer 305-2 and inset layer 320 (side glazing).

The edge of glazing 300 furthermore is formed by a section comprising elements 325 and 330, enabling its fastening.

An antenna 335 is inserted between inset layer 315 and glass layer 305-3. In this way antenna 335 is positioned between the heating film and the outside surface of glazing 300. Antenna 335 here is connected to a connector 340 making it possible to connect it to a ground 345 of the aircraft as well as to a communication system (not shown) via connection 350.

The inserted antenna may be a narrow- or wide-band antenna with vertical, horizontal or circular polarization. This antenna may be, in particular, an equiangular spiral antenna such as the one shown on FIG. 5.

The heating film used for defogging serves as a reflector. In this way the gain of the antenna is enhanced and disruptions sustained inside the cockpit are reduced.

Alternatively or additionally, antenna 335 may be inserted between inset layer 310 and glass layer 305-1 in order to allow a wireless communication inside the aircraft.

Figure 4:
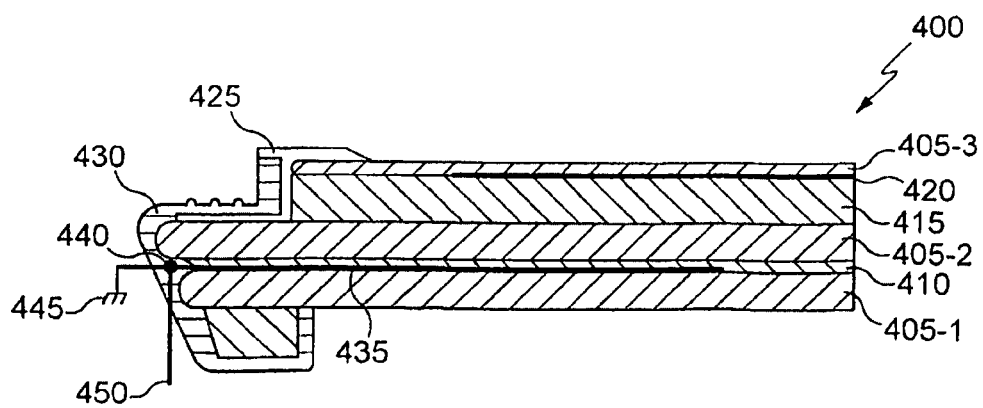
FIG. 4 illustrates a second embodiment of a communication device in accordance with the invention according to which an antenna is inserted into the glazing, between its inside surface and a heating film.

FIG. 4 illustrates a second embodiment of a communication device in accordance with the invention according to which an antenna is inserted in the glazing, between its inside surface and a heating film.

Like the glazing illustrated on FIG. 2, glazing 400 comprises three glass layers 405-1 to 405-3 separated by inset layers 410 and 415.

Heating film 420 here is inserted between inset layer 415 and glass layer 405-3 (front glazing).

The edge of glazing 400 furthermore is formed by a section comprising elements 425 and 430, enabling its fastening.

An antenna 435 is inserted between glass layer 405-1 and inset layer 410. Antenna 435 therefore is positioned between the heating film and the inside surface of glazing 400. Just as for antenna 335 illustrated on FIG. 3, antenna 435 here is connected to a connector 440 making it possible to connect it to a ground 445 of the aircraft as well as to a communication system (not shown) via connection 450.

Again, the inserted antenna may be a narrow- or wide-band antenna with vertical, horizontal or circular polarization. This antenna may be, in particular, an equiangular spiral antenna such as the one shown on FIG. 5.

The heating film used for de-icing serves as a reflector. In this way the gain of the antenna is enhanced and disruptions sustained inside the cockpit are reduced.

FIG. 5 presents an exemplary equiangular spiral antenna that may be used to implement the invention. Here it involves a quasi-directive antenna having a gain of 9 dB and an impedance of 59 ohms over the entire band, its external radius being 2.25 cm and the length of its arms being 6 cm. This antenna makes it possible to cover a broad range of frequencies with reduced space requirement and set-up. The maximal power radiated by this antenna is low.

FIG. 6 illustrates a third embodiment of a communication device in accordance with the invention according to which an antenna is bonded or fastened onto a glazing, on an outside part of the glazing. The presence of the heating filter fulfilling the role of reflector allows the antenna to radiate toward the outside of the aircraft.

The antenna preferably is bonded in a screen-printed zone of the glazing.

FIG. 6 shows a view of a front glazing 600, seen from the cockpit side. The glazing here comprises a screen-printed zone 605 onto which a wide-band spiral antenna 610 is bonded or fastened. The antenna may be bonded or fastened to the inside and/or to the outside of the aircraft.

Antenna 610 advantageously is bonded or fastened onto the glazing before installation of the latter on the aircraft, in order to simplify the connection of the antenna to the corresponding communication system. The connection may be implemented with a simple film comprising conductive strips. Alternatively, other standard connection means may be used.

An antenna likewise may be bonded or fastened onto a side glazing or onto a window, on its outside and/or inside surface.

FIG. 7 illustrates the communication range of antennas disposed in or on the glazings of an aircraft cockpit comprising a reflective layer. Aircraft 700 here comprises three additional antennas, two antennas incorporated into two opposite side glazings and one antenna bonded onto the surface of a front glazing. These antennas are installed between an outer surface of the glazings and a heating film. Sections 705, 710 and 715 show the angle of radiation of the antenna disposed on the front glazing and of the antennas incorporated into the side glazings, respectively. It may be noted that since these antennas are installed on the periphery of the aircraft, the radio shadow generated by the aircraft is limited.

These antennas enable the aircraft to communicate with a wireless communication means positioned on the ground on the side accesses of the airplane. These antennas may be wide-band antennas thus covering current needs or even future needs on other frequency bands.

The combination of standard antennas with a reflective layer of the glazing on which they are installed provides many advantages including the optimization of data reception, the improvement of the directivity of the antenna, the implementation of wide-band antennas, the possibility of incorporating several types of antennas on the same glazing, the reduction of weight and space requirement of the antennas, the choice of radiation toward the inside or the outside of the aircraft and the elimination of aerodynamic drags.

Naturally, to satisfy specific needs, an individual competent in the field of the invention will be able to apply modifications in the foregoing description.

The invention claimed is:

1. A wireless communication device for an aircraft, comprising:
   at least one antenna; and
   a transparent multilayer substrate configured to receive the at least one antenna,
   wherein at least one part of one layer of the substrate is at least partially reflective to electromagnetic waves transmitted or received by the at least one antenna, the at least one part of the layer of the substrate being located partially opposite the at least one antenna,
   the at least one antenna is inserted between two layers of the substrate, and
   the at least one antenna is connected to a ground terminal that is external to the transparent multilayer substrate.

2. A device according to claim 1, wherein the transparent substrate is a side glazing, a front glazing, or a window of the aircraft.

3. A device according to claim 1, wherein the at least one part of the layer of the substrate is a de-icing or defogging heating film.

4. A device according to claim 1, wherein the at least one antenna is fastened onto one of outer surfaces of the substrate.

5. A device according to claim 1, wherein the at least one antenna is placed between the at least one part of the layer of the substrate and an outside surface of the device.

6. A device according to claim 1, wherein the at least one antenna is placed between the at least one part of the layer of the substrate and an inside surface of the device.

7. A device according to claim 1, wherein the at least one antenna, as a first antenna, is positioned between the at least one part of the layer of the substrate and an outer surface of the device, and wherein the device comprises at least one second antenna, the at least one second antenna being positioned between the at least one part of the layer of the substrate and another outer surface of the device, opposite the outer surface.

8. An aircraft comprising at least one device according to claim 1.

9. An aircraft comprising at least two devices according to claim 1, the at least two devices forming at least a part of two opposite side glazings of the aircraft.

10. A device according to claim 1, the transparent multilayer substrate including at least three glass layers and at least two interlayers each disposed between two of the three glass layers, wherein the antenna is disposed between one of the interlayers and one of the glass layers.

11. A device according to claim 1, wherein the at least one antenna is connected to the ground terminal via an electrical path formed between two layers of the transparent multilayer substrate.

* * * * *